Sept. 25, 1962 S. L. HJERTSTRAND 3,055,986

SIGNALLING ARRANGEMENT FOR AUTOMATIC TELEPHONE SYSTEMS

Filed Oct. 10, 1958

5 Sheets-Sheet 1

Inventor
S.L. HJERTSTRAND

By Robert Harding Jr.
Attorney

Sept. 25, 1962 S. L. HJERTSTRAND 3,055,986

SIGNALLING ARRANGEMENT FOR AUTOMATIC TELEPHONE SYSTEMS

Filed Oct. 10, 1958

5 Sheets-Sheet 2

Inventor
S.L. HJERTSTRAND

By
Robert Harding Jr.
Attorney

Sept. 25, 1962 S. L. HJERTSTRAND 3,055,986
SIGNALLING ARRANGEMENT FOR AUTOMATIC TELEPHONE SYSTEMS
Filed Oct. 10, 1958
5 Sheets-Sheet 3

Inventor
S.L. HJERTSTRAND
By Robert Harding Jr.
Attorney

Sept. 25, 1962 S. L. HJERTSTRAND 3,055,986
SIGNALLING ARRANGEMENT FOR AUTOMATIC TELEPHONE SYSTEMS
Filed Oct. 10, 1958 5 Sheets-Sheet 4

*Inventor*
S.L. HJERTSTRAND
*By* Robert Harding Jr.
*Attorney*

Sept. 25, 1962 S. L. HJERTSTRAND 3,055,986

SIGNALLING ARRANGEMENT FOR AUTOMATIC TELEPHONE SYSTEMS

Filed Oct. 10, 1958

5 Sheets-Sheet 5

Inventor
S.L. HJERTSTRAND
By
Robert Harding Jr.
Attorney

United States Patent Office 3,055,986
Patented Sept. 25, 1962

3,055,986

SIGNALLING ARRANGEMENT FOR AUTOMATIC TELEPHONE SYSTEMS

Svante Lennart Hjertstrand, Hagersten, Sweden, assignor to International Standard Electric Corporation, New York, N.Y., a corporation of Delaware Filed Oct. 10, 1958, Ser. No. 766,432
Claims priority, application Sweden Oct. 10, 1957
3 Claims. (Cl. 179—90)

The present invention relates to a method of digital signalling beween a telephone subset and a telephone exchange station. A digit is characterised by a simultaneous occurrence of a resistance change in the line loop of the subset and the transmission of a tone frequency current from the subset. The said resistance changes and tone frequency transmissions may be obtained by means of push-buttons.

According to the invention there is provided a signal transmission system for automatic telephone exchange stations for signalling over a two-wire line wherein each signal consists of signal elements located both within and outside the normal telephone transmission range.

The invention will be more readily understood from the following description thereof taken in conjunction with the accompanying drawings, in which.

Figure 1:
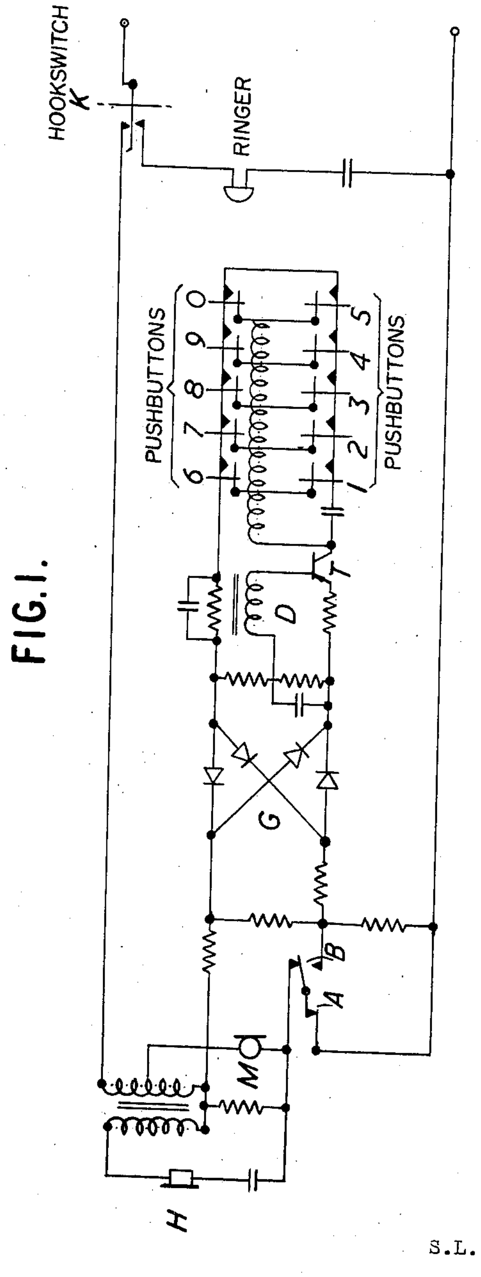
FIG. 1 shows a circuit diagram of a telephone subset showing the interconnection of a transmitter M, and a receiver H with the other usual subset components.
Figure 3:
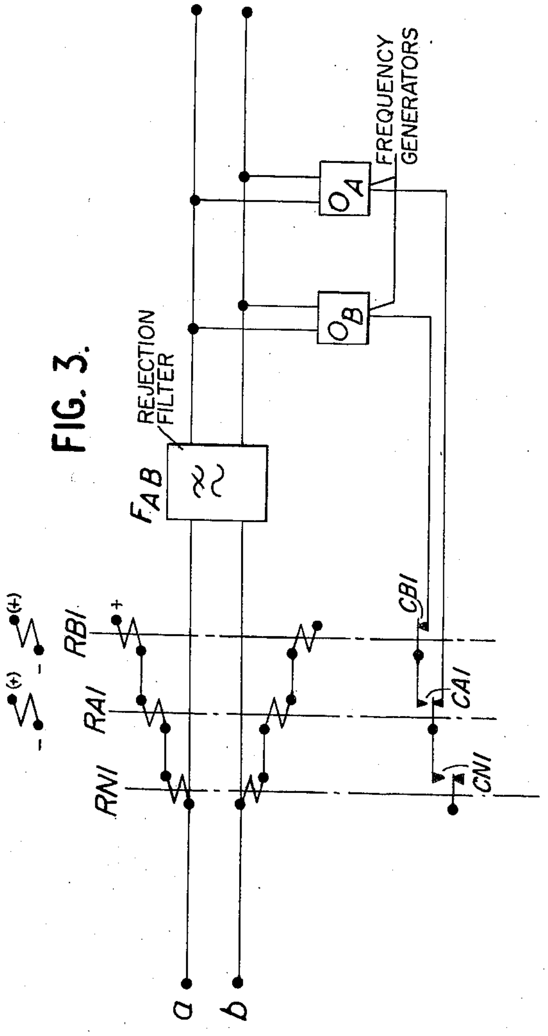
Figure 4:
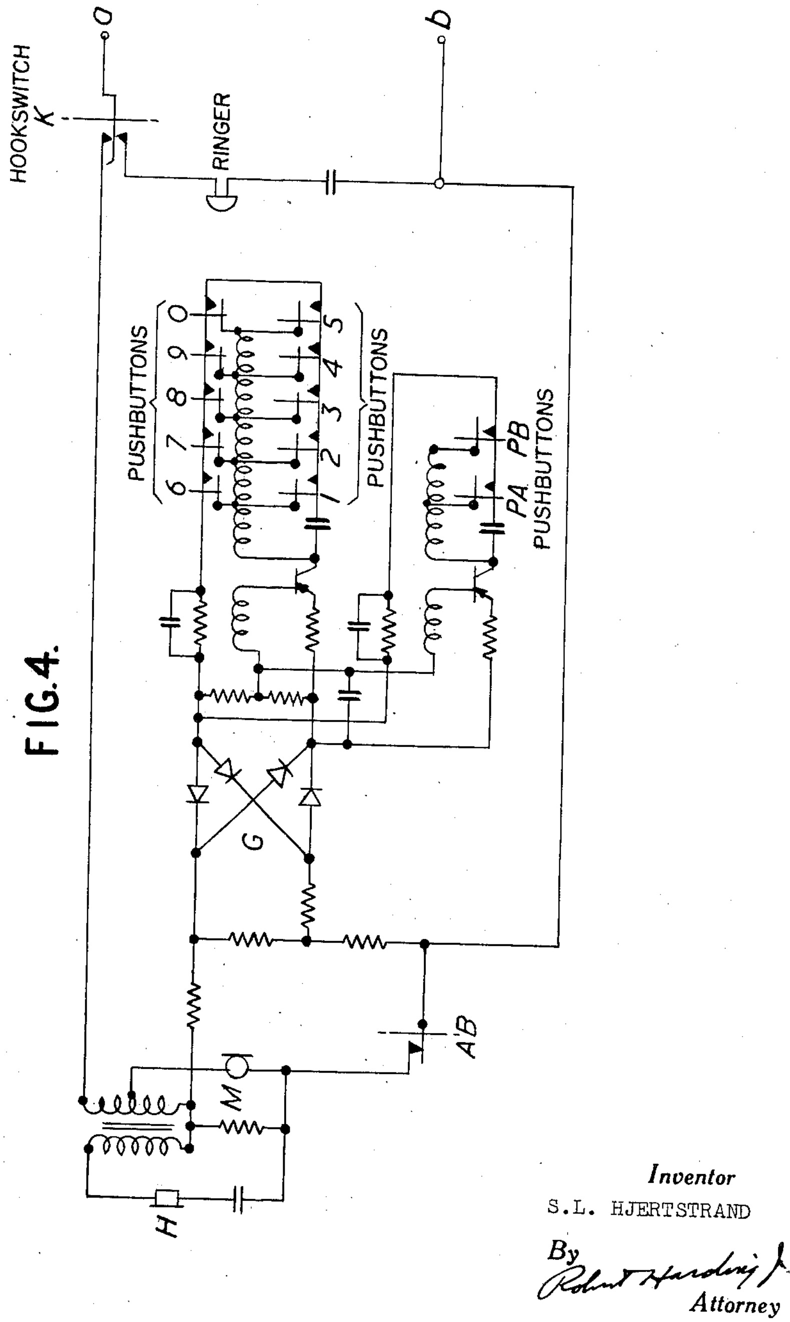
Figure 5:
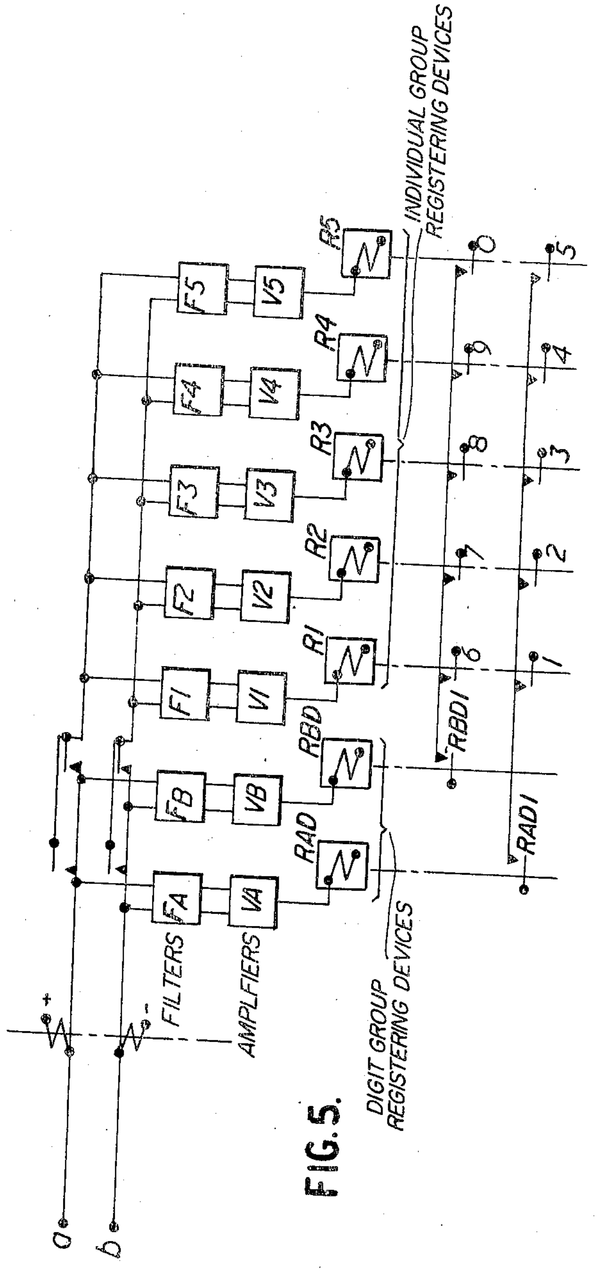

FIG. 3 schematically represents trunk line relay equipment;

FIG. 4 shows a modification of the circuit arrangement and diagram exemplified in FIG. 1, and FIG. 5 illustrates the digit receiving arrangement at the telephone exchange station.

With reference to the drawings, FIG. 1 shows the principal circuit diagram of a telephone subset according to the invention. The ten push-buttons numbered 1 to 0 are each provided with a contact connected to a choke D of the subset's tone frequency generator. In the present case the choke D is provided with five tapping points corresponding to five employed signalling frequencies. The push-buttons 1, 2, 3, 4 and 5 also operate the break contact A common thereto, while the push-buttons 6, 7, 8, 9 and 0 are arranged also to operate their common change-over contact B. It will readily be understood that the functions of the contacts A and B likewise may be attained by allotting to each of the ten push-buttons corresponding individual contacts where the break functions occur serially. When the break contact opens, the contact functions give rise to an increase of the subset's resistance. The operation of the contact B also results in an increase of the subset's resistance, but not in such a high increase as when contact A becomes operated. The resistance values corresponding to the operation of the contacts A and B are so chosen, that the signal responsive means of the telephone exchange station are rendered capable of mutual discrimination between these values and also capable of separating them from the resistance of the subset when none of the push-buttons has been operated and likewise from the state of total interruption when the handset is restored. Hence, in principle there are four resistance values subject to discrimination at the signal responsive means of the telephone exchange station, viz. total interruption, the resistance value when contact A is operated, the resistance value when contact B is operated, and a closed line circuit loop. This implies that a digit is characterized by one of two possible resistance values as determined by the operation of contact A or contact B and by one of five different possible frequencies. Theoretically it may likewise be possible to characterise a digit by means of one of three or four possible resistance values and by one of three or four possible frequencies. Taking voltage variations, the lengths of the telephone lines and their leakage conditions under consideration, a more reliable system may likely be obtained by limiting the number of resistance values to a figure as low as possible. A system having one resistance value and ten different frequencies might likely also be used, but by the provision of a further resistance value for the digit combination the number of requisite frequencies becomes reduced to half the number described above. Whenever either of the contacts A or B is operated, a voltage is applied to the transistorised tone frequency generator via a Graetz bridge G adapted to supply voltage of correct polarity to the tone frequency generator independent of the polarity of the telephone line circuit.

Figure 2:
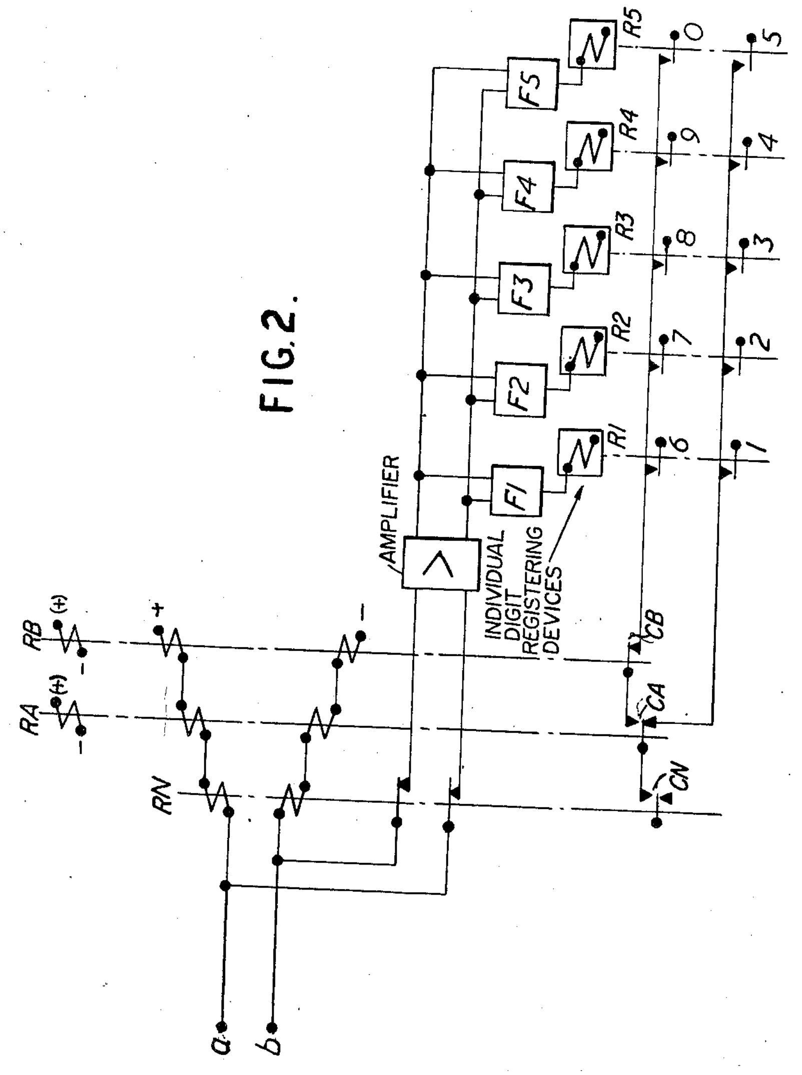
FIG. 2 illustrates the signal responsive means at a telephone exchange according to the invention.

The principles applicable to the signal responsive means of the telephone exchange station are disclosed in FIG. 2, where the three relays RN, RA and RB are adapted to analyse or to scan the resistance conditions of the telephone line circuit connected thereto. If the line circuit loop is closed through the subset, where no digit has been marked, then all of these three relays CN, CA, and CB are operated with their armatures attracted. On the other hand, if any digit corresponding to the resistance value of the subset determined by the operation of contact B of FIG. 1 and indicative of the digits 6, 7, 8, 9 and 0, has been marked at the subset, relay RB releases, while the relays RA and RN still remain in their operated state. When the resistance value determined by the operation of contact A has been marked at the subset in order to transmit any of the digits 1, 2, 3, 4 and 5, both relays RA and RB are caused to release, while relay RN still remains operated, and if the handset is restored to its normal position at the subset, so that the line circuit loop becomes interrupted, all of the relays release at the telephone exchange station. Hence, the signal responsive means at the exchange station are capable of discriminating between these four resistance values which possibly may occur, namely a closed line circuit loop, a low additional or extra resistance, a high additional or extra resistance and a total interruption of said loop. Whenever any of the resistance values determined by the operation of contacts A or B is marked, the tone frequency receiving equipment with its five filters F1 to F5 and five registering devices R1 to R5 are rendered effective so that the frequency of the tone being transmitted at the same instant of time as the resistance change may be detected by said signal responsive means which now may receive all items of information required for determining and storing the transmitted digit. Due to the fact, that the tone frequency receiving equipment with its filters F1 to F5 is effectively rendered operative only in response to a resistance increase in the loop, any false tone frequency signal, e.g. from the microphone, will not disturb the signal responsive means.

Since the microphone M is disconnected during digital signalling by the operation of either contacts A or B of FIG. 1, this microphone will in no way exert any detrimental influence upon the signal transmission. In telephone systems in which the digit transmitting subset is not directly connected to register means during the entire time of the establishment of connections, e.g. in connection with central line calls from automatic exchanges or at terminal exchange stations in the course of external switching operations, the digital transmission may be effected by a central line equipment or by repeaters in that the D.C. signals, i.e. the resistance changes, are converted in the repeater into tone frequency currents which cannot pass through the repeater in quesion.

When either contact A or B is operated and the corresponding combination of relays RN, RA and RB is operated, respectively coresponding frequency generators OA and OB are operated by the contacts CN1, CA1 and CB1 of respectively corresponding receiving relays RN1, RA1 and RB1. Frequencies $f_A$ and $f_B$ are generated and transmitted to the receiving equipment. These signals are assumed to lie above the normal speech frequency band. In order to prevent false signals from the microphone giving rise to the frequencies $f_A$ and $f_B$ on the central line circuit, a high-frequency rejection filter $F_{A-B}$ has been inserted in the central line circuit, as is shown in FIG. 3. Thus, in circuit arrangements of this type a digit occurring in the signal responsive means will be characterized by a combination of one frequency of two possible frequencies $f_A$ and $f_B$ and of another frequency of five possible frequencies.

The above described signalling system forming a combination of D.C. and A.C. signals may be said to constitute a special case of a general method of signalling achieved by a combination of signal elements, of which at least any combinational element of a digit as seen from a transmissional viewpoint is located outside the normal range of transmission of the microphone. The D.C. signals used in the above described system may, accordingly, be considered to form two different amplitudes of a signal occupying a range below the transmission range of the microphone. In a similar manner it might be possible to transmit the information indicative of the operation of contacts A or B by means of frequencies occupying a range above the normal frequency range of the microphone and the receiver.

FIG. 4 illustrates the principle applied to a telephone subset wherein the two last-mentioned items of information are transmitted by means of frequencies occupying a range above the normal range of transmission of the subset, while the five previously mentioned frequencies lie within the normal speech frequency band. The actuation of a push-button causes the microphone to be disconnected at the contact AB in common to said push-buttons, whereby the said push-button at contacts PA and PB simultaneously also renders effective the subset's tone frequency generating equipment set in such a manner, that the two-frequencies corresponding to the digit in question are generated, whereby the one of the so generated tones has the frequency $f_A$ or $f_B$.

FIG. 5 shows the digit receiving arrangement of a telephone exchange station comprising the digit group filters $F_A$ and $F_B$ and also the individual digit filters F1 to F5 corresponding to the frequencies used. These filters are connected to amplifying means VA, VB and V1 to V5 and to registering means RAD, RBD and R1 to R5 which through contacts RAD1, RBD1 and contacts 1 to 0 allow a transmitted digit to be stored.

As a variant or modification of the systems described in the foregoing, attention is called to the possibility of combining a digit of two frequencies lying within the normal transmission range of the microphone, while a specific signal laying outside the normal speech frequency band of the subset indicates transmission of a digit. It is thus possible that a D.C. signal caused by the operation of contact AB in FIG. 4, is combined with any of the five frequencies within the speech frequency band, whereby two of these five frequencies as simultaneously transmitted to indicate a particular digit.

While the above principles according to the invention have been described in connection with specific embodiments thereof and by way of examples, it is clearly to be understood that this description is made only by way of example and not as a limitation to the scope of this invention.

What I claim is:

1. In a signalling system for use in telephone exchanges for extending connections between subscriber stations on called and calling lines, transmitting means at each station on any calling line for transmitting digit signals indicative of the telephone number of any desired called station, receiving means in the said exchange for extending a connection from the calling station to the said desired station in accordance with said transmitted signals, said transmitting means including a plurality of selecting keys with each key corresponding to a separate digit value, the said plurality of keys comprising first and second sets, a multi-frequency generator in each of said stations, first means responsive to the actuation of any key in either set for controlling said generator to transmit a corresponding frequency to said receiving means, second means responsive to the said actuation for selectively controlling the resistance of the calling line, and means in said receiving means for responding to combined transmitted frequency and resistance conditions to extend the said connection.

2. A signalling system according to claim 1 wherein the said second means includes resistors which are switched into and out of circuit with said calling line.

3. A signalling system according to claim 1 wherein the said receiving means includes a separate filter for each of the said transmitted frequencies and includes resistance detecting means for discriminating between the said resistance conditions, output wires corresponding respectively to the values of any digit, and means controlled jointly by said filters and said resistance detecting means for energizing the output wire corresponding to the digit value which corresponds to the said actuated key.

References Cited in the file of this patent

UNITED STATES PATENTS

| | | |
|---|---|---|
| 2,232,398 | Lundstrom | Feb. 18, 1941 |
| 2,554,201 | Lundkvist | May 22, 1951 |
| 2,717,280 | Lovell | Sept. 6, 1955 |
| 2,875,281 | Townsend | Feb. 4, 1959 |